INVENTORS:-
ALAN SALISBURY LAMBURN &
RANDLE LESLIE ABBOTT
BY:-
ATTORNEY

United States Patent Office 3,350,960
Patented Nov. 7, 1967

3,350,960
POWER TRANSMISSION SYSTEM
Alan S. Lamburn, Kencott, Via Lechlade, and Randle L. Abbott, Leamington Spa, England, assignors to Axel Wickman Transmissions Limited, Coventry, England
Filed Mar. 19, 1965, Ser. No. 441,023
Claims priority, application Great Britain, Mar. 25, 1964, 12,520/64
12 Claims. (Cl. 74—701)

This invention relates to a power transmission system of the kind including a change-speed gearing having its power output shaft coaxial with and connected to drive the power input gear of a transfer gearing of which the power output gear is coaxial with and adapted to drive two oppositely-extending drive shafts that are parallely-spaced from the power output shaft of the change-speed gearing and are adapted to drive road wheels of a motor vehicle.

Power transmission systems of the kind set forth can be arranged to provide a vehicle with either a four wheel drive or with a drive only to a pair of wheels. In the case where the power transmission system is to provide a four wheel drive, the two oppositely-extending drive shafts would each be connected to drive a separate differential gearing interconnecting a pair of road wheels. However, where the power transmission system is to provide a two wheel drive, the two oppositely-extending drive shafts would each be connected to drive one road wheel and would be driven from the power output gear of the transfer gearing through a differential gearing. In both the case of a four wheel drive and of a two wheel drive, the main purpose of the transfer gearing is to space the two drive shafts away from the power output shaft of the change-speed gearing so that the drive shafts will not foul the casing of the change-speed gearing or the motor vehicle power plant.

For a number of years motor vehicle manufacturers have offered to prospective purchasers vehicles having a basic transmission system which may be modified, at the purchasers option, by the addition of an auxiliary two-speed gearing which provides an overdrive ratio. In some instances the auxiliary two-speed gearing may be arranged to provide an underdrive ratio instead of overdrive. With a conventional transmission system in which the clutch and the power input member of the change-speed gearing are aligned with the engine crankshaft and the power output member of the change-speed gearing is coaxially fast with a propeller shaft for transmitting torque to the driving axle, an auxiliary two-speed gearing constituting an overdrive is conventionally arranged between the power output member of the main change-speed gearing and the propeller shaft. Thus, when an auxiliary two-speed gearing is offered as an optional extra in a conventional transmission system, the position of the engine and the main change-speed gearing need not be disturbed and it is only necessary to shorten the propeller shaft in order to accommodate the auxiliary gearing. Although it is a simple matter to provide an auxiliary two-speed gearing as an optional extra for a motor vehicle having a conventional transmission system, considerable problems arise when it is desired to provide an auxiliary two-speed gearing as an optional extra for a motor vehicle having a transmission system of the kind in which the main change-speed gearing has its power output shaft coaxial with and connected to drive the power input gear of a transfer gearing of which the power output gear as coaxial with and adapted to drive two oppositely-extending drive shafts that are parallelly-spaced from the power output shaft of the main change-speed gearing and are adapted to drive road wheels of a motor vehicle. In fitting an auxiliary gearing to a transfer gearing transmission system in accordance with current practise, it would be necessary to arrange the auxiliary gearing between the main change-speed gearing and the transfer gearing with the inherent inconvenience that either the engine and the main change-speed gearing would have to be repositioned in the vehicle chassis frame, or the transfer gearing would have to be repositioned in the vehicle chassis frame and the lengths of both drive shafts would have to be altered. Accordingly it will be appreciated that it has not hitherto been an attractive proposition for a motor vehicle manufacturer to offer an auxiliary overdrive or auxiliary underdrive gearing as an optional extra in a transfer gearing transmission system. In fact the problem of repositioning either the engine and main change-speed gearing or the transfer gearing has deterred motor vehicle manufacturers from offering on auxiliary overdrive or auxiliary underdrive gearing as an optional extra although there is a considerable demand for this facility.

It is an object of this invention to mitigate the above disadvantages by enabling an auxiliary two-speed gearing to be fitted as an optional extra to a transfer gearing transmission system without repositioning the engine, the main change-speed gearing or the transfer gearing.

According to one aspect of the invention a power transmission system, of the kind including a main change-speed gearing having its power output shaft coaxial with and connected to drive the power input gear of a transfer gearing of which the power output gear is coaxial with and adapted to drive two oppositely-extending drive shafts that are parallelly-spaced from the power output shaft of the main change-speed gearing and are adapted to drive road wheels of a motor vehicle, has the power output shaft of the main change-speed gearing extending coaxially through the power input gear of the transfer gearing and connected to drive the power input member of a two-speed subsidiary gearing which is arranged on the opposite side of the transfer gearing to the main change-speed gearing and has its power output member connected to drive the power input gear of the transfer gearing.

According to a further feature the power input gear of the transfer gearing may be supported by a bearing from the power output shaft of the main change-speed gearing.

According to another feature the two-speed subsidiary gearing may be an epicyclic gearing which has a clutch member for optionally selecting either the unit ratio or the planetary ratio, and the clutch actuating mechanism is arranged on the side of the epicyclic gearing remote from the transfer gearing. In such a case the power output shaft of the main change-speed gearing may, according to a further feature, extend through the epicyclic gearing to drive a pump that is arranged on the side of the epicyclic gearing remote from the transfer gearing and is adapted to supply fluid pressure for actuating the clutch mechanism.

According to yet another feature the portion of the power output shaft of the main change-speed gearing that extends through the power input gear of the transfer gearing may be formed as a separate member which is held rotatively fast with the power output shaft of the main change-speed gearing. In such a case the said separate member and the power output shaft of the main change-speed gearing may, according to a further feature, have external splines which are drivingly connected by an internally splined sleeve from which the power input gear of the transfer gearing is supported by a bearing.

According to another aspect of the invention the method of attaching a subsidiary two-speed gearing to a power transmission system, of the kind including a main change-speed gearing having its power output shaft coaxial with and detachably connected to drive the power input gear of a transfer gearing of which the power output gear is coaxial with and adapted to drive two oppositely-extending drive shafts that are parallelly-spaced from the power output shaft of the main change-speed gearing and are adapted to drive road wheels of a motor vehicle and a casing for the transfer gearing is provided with an opening coaxial with the power output shaft of the main change-speed gearing in order to enable a power take-off to be driven from said power output shaft, includes removing the power input gear of the transfer gearing from said power output shaft, and attaching the subsidiary gearing to the casing of the transfer gearing so that its power input member extends through said opening to be drivingly engaged by said power output shaft in the same manner as that by which the power input gear of the transfer gearing was secured, and so that a power output member of the subsidiary gearing extends coaxially about said power input member through said opening whereby a power input transfer gear similar to the one removed will occupy the original position of the latter and be driven by said power output member.

The invention is now described, by way of example only, with reference to the accompanying drawings, in which.

Figure 1:
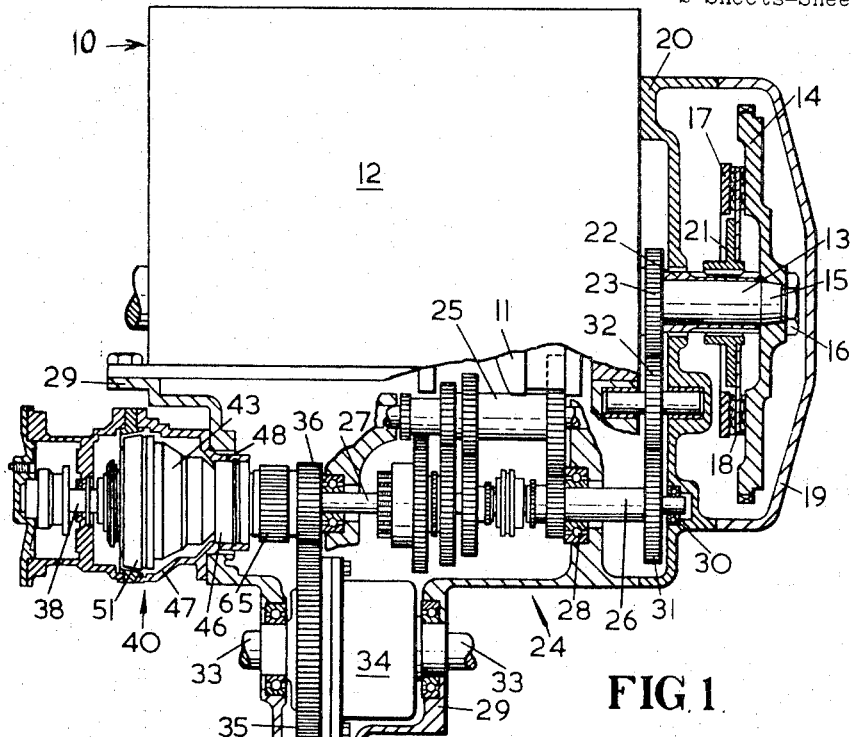
FIGURE 1 is a side elevation of one form of power transmission system with the casing broken away so that the various gear trains may be seen.
Figure 2:
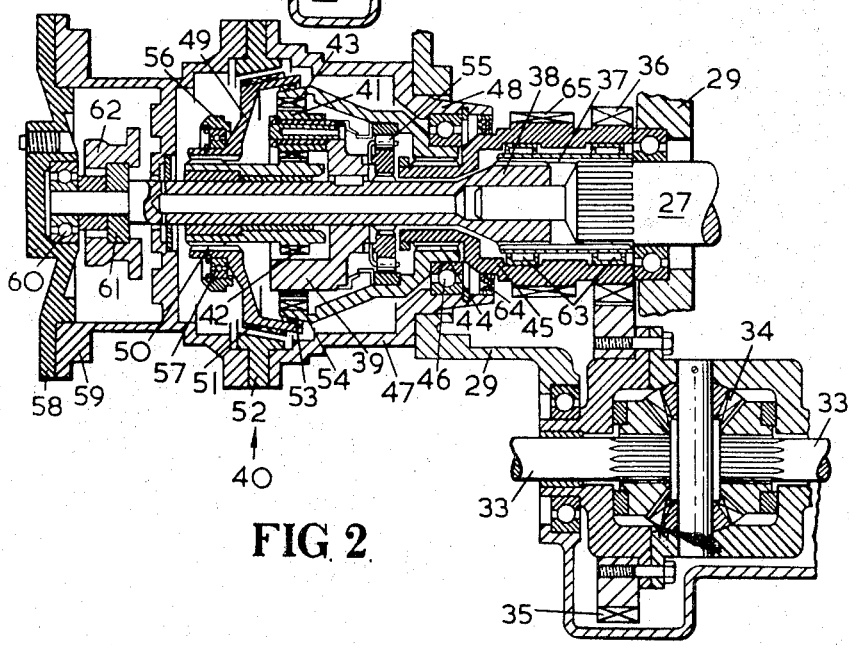
FIGURE 2 is a fragmentary view of the left-hand portion of FIGURE 1 but drawn to a larger scale and in section.

Referring first to FIGURES 1 and 2, a reciprocating internal combustion engine 10 has a crankshaft 11 which is supported by bearings (not shown) within a crank case 12 and is formed with an extension 13. A flywheel 14 is located by a tapered surface 15 formed on the end of extension 13 and is held drivingly fast with the latter by a nut 16 coacting with a threaded portion formed adjacent surface 15. A pressure plate 17 is held drivingly fast in any convenient manner with the flywheel 14, and a clutch plate 18 is sandwiched between the flywheel 14 and the pressure plate 17. An unshown spring means is arranged in a manner well known in the art to urge the pressure plate 17 towards the flywheel 14 so that the latter can drive the clutch plate 18, and unshown withdrawal means is arranged to react against the spring means in a manner well known in the art so that the drive between the flywheel and the clutch plate will be broken whenever the withdrawal means is operated. The flywheel 14 and the clutch assembly 17, 18 are enclosed by a casing 19 which is secured to the crank case 12 through an intermediate casing 20.

The clutch plate 18 has a splined hub 21 through which it transmits drive to a tubular shaft 22 that is juornalled coaxially about extension 13 and is formed integral with a gear wheel 23. A main change-speed gearing is indicated generally by arrow 24 and comprises a layshaft gear cluster 25, a first motion shaft 26 and a third motion shaft 27. The first motion shaft 26 is supported by a bearing 28 from a casing 29 defining the sump of engine 10 and by a bearing 30 from casing 20. A gear wheel 31 is connected to drive the first motion shaft 26 and is driven from gear wheel 23 through an idler gear wheel 32. The operation of the main change-speed gearing 24 is not a feature of this invention and may be assumed as providing a number of gear ratios between the first motion shaft 26 and the third motion shaft 27 which constitutes the power ouput shaft.

The power transmission system as described to this point is well known, the engine 10 being arranged with the axis of its crankshaft 11 directed transversely of a motor vehicle and the third motion shaft 27 being connected to drive a pair of drive shafts 33 through a differential 34, a crown wheel 35 and a gear wheel 36 secured to the third motion shaft 27. Each shaft 33 is provided with a universal joint (not shown) which is connected to drive an independently supported road wheel.

However, with the present invention, the gear wheel 36 is not secured to the third motion shaft 27 which, as will be seen in FIGURE 2, is connected by an internally splined sleeve 37 to drive a shaft 38 that is drivingly connected to the planet carrier 39 of an auxiliary two-speed epicyclic gearing 40. Three planet gear wheels 41, only one of which is shown, are supported by the planet carrier 39 and mesh with a sun gear wheel 42 and an annulus gear wheel 43 which is drivingly connected by splines 44 to the hub 45 of gear wheel 36. The annulus gear wheel 43 is supported by a bearing 46 from a casing 47 having a nose 48 engaged in a corresponding aperture in sump casing 29, the casing 47 being secured to the casing 29 by bolts which are not shown. The subsidiary gearing 40 is controlled in a well known manner by a clutch member 49 which is drivingly connected by splines 50 to the sun wheel 42 and may be slid axially along splines 50 for a frusto-conical pad 51 to engage a clutch ring 52 secured to casing 47, so that the sun wheel 42 is prevented from rotation and the third motion shaft 27 will drive the gear wheel 36 at the planetary overdrive ratio of the subsidiary gearing 40. Alternatively the clutch member 49 may be slid axially to the position shown in FIGURE 2 for a frusto-conical clutch pad 53 to engage a corresponding clutch surface 54 defined by the annulus gear wheel 43, so that the sun wheel 42 is locked to the annulus gear wheel 43 to inhibit the planetary motion whereby the third motion shaft 27 will drive the gear wheel 36 at unit ratio. A unidirectional clutch 55 is arranged operatively between shaft 38 and the annulus gear wheel 43 to prevent the latter from rotating slower than shaft 38; in this manner the clutch pad 53 is relieved from transmitting torque after unit ratio has been engaged, the torque being transmitted through the unidirectional clutch 55.

The movement of clutch member 49 is controlled in known manner by a fluid-operable piston and cylinder assembly which opposes a set of compression coil springs, the resultant force being applied to the clutch member 49 by a thrust ring 56 and a thrust race 57. An end plate 58 is secured to casing 47 through a casing 59 and a clutch ring 52, and supports the end of shaft 38 in a bearing 60. An eccentric 61 is driven by the end of shaft 38 and is arranged to drive a pump, for supplying the said fluid-operable piston and cylinder assembly, through a sleeve 62 which is part of a connecting rod that drives the pump. It will be appreciated from FIGURE 2 that the said pump and all the controls for actuating the thrust ring 56 can conveniently be arranged at the side of the auxiliary gearing 40 remote from the gear train 36, 35, and that the latter constitutes a transfer gearing interconnecting the power output shaft 27 of the main change-speed gearing 24 and the drive shafts 33.

The hub 45 of gear wheel 36 is supported from sleeve 37 by a pair of needle roller bearings 63, and an oil seal 64 may be provided between the hub 45 and nose 48 to prevent the lubricant of the auxiliary gearing from intermixing with the lubricant in the sump 29. It will be seen from FIGURE 2 that the entire auxiliary gearing 40 is held together as one unit by the end plate 58 and casings 47 and 59, and in this manner the fitting of the auxiliary gearing 40 as an optional extra is facilitated. A speedometer drive 65 is preferably formed integral with hub 45.

Figure 3:
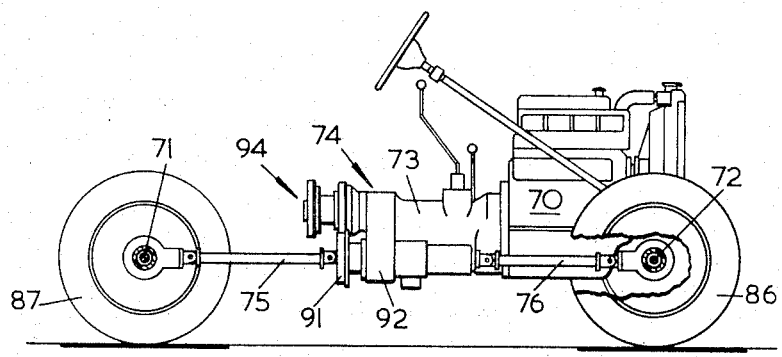
FIGURE 3 is a side elevation of a motor vehicle chassis with many parts broken away to show another form of power transmission system.
Figure 4:
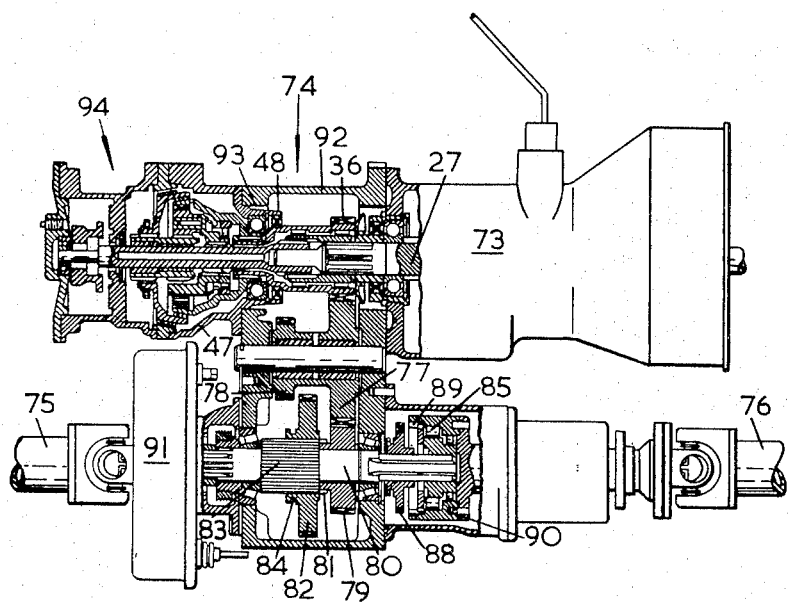
FIGURE 4 is an enlarged view of the power transmission system shown in FIGURE 3 but drawn partly in section.

The arrangement shown in FIGURES 3 and 4 has a reciprocating internal combustion engine 70 which is arranged to drive two differential axles 71, 72 through a main change-speed gearing 73, a transfer gearing 74 and propeller shafts 75 and 76 respectively. As will be appreciated from FIGURE 4 the drive from the third motion shaft 27 of the main change-speed gearing 73 would conventionally be transmitted to gear wheel 36 which drives a gear cluster 77, 78. A gear wheel 79 journalled on a shaft 80 is provided with splines 81 and permanently meshes gear wheel 77. A gear wheel 82 is held drivingly fast with shaft 80 by splines 83 and is axially movable by an unshown selector fork that engages groove 84 so that gear wheel 82 may be moved to the right in order to lock the splines 81 of gear wheel 79 to splines 83 for the drive between gear wheel 36 and shaft 80 to be through gear wheels 77 and 79, or so that gear wheel 82 may be moved to the left in order to free gear wheel 79 from shaft 80 and to mesh gear wheel 82 with gear wheel 78 for the drive between gear wheel 36 and shaft 80 to be through gear wheels 77, 78 and 82. Shaft 80 is directly connected to drive propeller shaft 75, and is connected to drive propeller shaft 76 through a unidirectional clutch 85 which is arranged to overrun if propeller shaft 76 tends to rotate faster than propeller shaft 75 so as to prevent the transmission from "winding up" due to the steerable wheels 86 of axle 72 traveling a greater mean distance than that covered by the non-steerable wheels 87 of axle 71. A dog clutch 88 is splined to shaft 80 and is axially movable to engage corresponding dogs 89 formed in the casing 90 of the unidirectional clutch 85 whereby the action of the latter may be inhibited when the vehicle is being driven over slippery surfaces so that all the wheels 86 and 87 will be driven. Shaft 80 is also connected to drive a drum 91 of a transmission brake.

The transfer gearing 74 normally has gear wheel 82 locking splines 81 and 83 together and is only moved to engage gear wheel 78 when the vehicle is required to give a higher tractive effort, say, when towing a heavy load. The casing 92 of the transfer gearing is provided with an aperture 93 for connecting a power take-off shaft to be driven from gear wheel 36. The power transmission system of FIGURES 3 and 4 as thus far described is well known and presents considerable difficulties if an auxiliary gearing, such as an overdrive, is to be provided as an optional extra. More particularly, if an overdrive were added in the conventional manner to the transmission system, it would be sandwiched between the casing of the main change-speed gearing 73 and casing 92 thus necessitating either moving the engine 70 and the main change speed gearing 73 forwards relatively to the vehicle chassis, or moving the transfer gearing 92 backwards relatively to the vehicle chassis and altering the lengths of propeller shafts 75 and 76. In order to overcome this problem, the present invention arranges the overdrive gearing 94 on the side of the transfer gearing 74 remote from the main change-speed gearing 73. As the construction and operation of the overdrive 94 is substantially the same as that of the overdrive 40 illustrated in FIGURES 1 and 2 the description is not repeated. However, it should be noted that the nose 48 of casing 47 is arranged to engage the normal power take-off aperture 93, and that the third motion shaft 27 is arranged to drive gear wheel 36 at whatever ratio of the auxiliary gearing 94 is engaged. In addition to providing an overdrive ratio when the drive between gear wheel 36 and shaft 80 is through gears 77 and 79, it should be appreciated that when the drive is through gears 77, 78 and 82 an intermediate ratio would be obtained when the planetary overdrive ratio of the auxiliary gearing 94 is engaged.

Although an auxiliary overdrive gearing has been illustrated in FIGURES 1 to 4, an auxiliary underdrive gearing could readily be substituted by any person skilled in the art of change-speed gearings. For instance, such a substitution could be made by turning the gearing back to front, by connecting shaft 38 to drive the annulus gear wheel 43 and by connecting the planet carrier 39 to drive gear wheel 36.

What we claim as our invention and desire to secure by Letters Patent of the United States is:

1. A power transmission system, for a motor road vehicle, including a main change-speed gearing, a two-speed auxiliary gearing, a power input member connected to drive said auxiliary gearing, a power output shaft connected to be driven by said main change-speed gearing and extending from said main gearing and connected to drive said auxiliary gearing power input member, a transfer gear train arranged intermediate said main gearing and said auxiliary gearing, a first gear forming part of said transfer gear train, said first gear defining a coaxial bore, said main gearing power output shaft extending coaxially through said coaxial bore, a power output member connected to be driven by said auxiliary gearing and connected to drive said first gear, a further gear driven by said first gear and forming part of said transfer gear train, the axis of said further gear being parallely spaced from said main gearing power output shaft, two oppositely-extending drive shafts coaxial with said further gear, and means connecting said further gear to drive said two drive shafts.

2. A power transmission system as in claim 1, including a bearing arranged operatively between said first gear of the transfer gear train and said main gearing power output shaft, whereby the first gear of the transfer gear train is rotatively supported from said main gearing power output shaft.

3. A power transmission system as in claim 2 and in which said auxiliary gearing comprises an epicyclic gearing providing optionally either a planetary ratio or unit ratio, a friction engaging means movable between two positions, said friction engaging means when in one of said positions arranged to select said planetary ratio, said friction engaging means when in the other of said positions arranged to select the said unit ratio, a mechanism for actuating said friction engaging means, said actuating mechanism operable to move the friction engaging means between the said two positions, and said actuating mechanism arranged on the side of the auxiliary gearing remote from the transfer gear train.

4. A power transmission system as in claim 3 and in which said actuating mechanism is fluid-operable, additionally including a pump for supplying fluid to said fluid-operable actuating mechanism, said pump arranged on the side of the auxiliary gearing remote from the transfer gear train, said main gearing power output shaft extending from said bore in the first gear of the transfer gear train through said auxiliary gearing, and said main gearing power output shaft remote from said first gear of the transfer gear train connected to drive said pump.

5. A power transmission system, for a motor road vehicle, including a main change-speed gearing, a two-speed auxiliary epicyclic gearing for providing optionally either a planetary ratio or unit ratio, a power input member connected to drive said auxiliary epicyclic gearing, a power output shaft connected to be driven by said main change-speed gearing and extending from said main gearing and connected to drive said auxiliary gearing power input member, a transfer gear train arranged intermediate said main gearing and said auxiliary epicyclic gearing, a first gear forming part of said transfer gear train, said first gear defining a coaxial bore, said main gearing power output shaft extending coaxially through said coaxial bore, a power output member connected to be driven by said auxiliary epicyclic gearing and connected to drive said first gear, a further gear driven by said first gear and forming part of said transfer gear train, the axis of said further gear being parallely spaced from said main gearing power output shaft, two oppositely-extending drive shafts coaxial with said further gear, means connecting said further gear to drive said two drive shafts, a friction engaging means movable between two positions, said friction engaging means when in one of said positions arranged to select said planetary ratio, said friction engaging means when in the other of said positions arranged to select the said unit ratio, a mechanism for actuating said friction engaging means, said actuating mechanism operable to move the friction engaging means between the said two positions, and said actuating mechanism arranged on the side of the auxiliary epicyclic gearing remote from the transfer gear train.

6. A power transmission system as in claim 5 and in which said actuating mechanism is fluid-operable, additionally including a pump for supplying the fluid to said fluid-operable actuating mechanism, said pump arranged on the side of the auxiliary epicyclic gearing remote from the transfer gear train, said main gearing power output shaft extending from said bore in the first gear of the transfer gear train through said auxiliary epicyclic gearing, and said main gearing power output shaft remote from said first gear of the transfer gear train connected to drive said pump.

7. A power transmission system, for a motor road vehicle, including a main change-speed gearing, a two-speed auxiliary gearing, a power input member connected to drive said auxiliary gearing, a power output shaft connected to be driven by said main change-speed gearing and extending from said main gearing and connected to drive said auxiliary gearing power input member, a transfer gear train arranged intermediate said main gearing and said auxiliary gearing, a first gear forming part of said transfer gear train, said first gear defining a coaxial bore, a power transmission member coaxially aligned with said main gearing power output shaft and with said auxiliary gearing power input member, said power transmission member connected to be driven by said main gearing power output shaft, said power transmission member extending coaxially through said coaxial bore, a power output member connected to be driven by said auxiliary gearing and connected to drive said first gear, a further gear driven by said first gear and forming part of said transfer gear train, the axis of said further gear being parallely spaced from said main gearing power output shaft, two oppositely-extending drive shafts coaxial with said further gear, and means connecting said further gear to drive said two drive shafts.

8. A power transmission system as in claim 7, including a bearing arranged operatively between said first gear of the transfer gear train and said power transmission member, whereby the first gear of the transfer gear train is rotatively supported from said power transmission member.

9. A power transmission system as in claim 8 in which said power transmission member is an internally splined sleeve, said main gearing power output shaft defines external splines meshing with said internal splines of said sleeve, said auxiliary gearing power input member defines external splines meshing with the internal splines of said sleeve, and said bearing is operatively connected to the external surface of said sleeve.

10. A power transmission system, for a motor road vehicle, including a main change-speed gearing, a two-speed auxiliary epicyclic gearing for providing optionally either a planetary ratio or unit ratio, a power input member connected to drive said auxiliary gearing, a power output shaft connected to be driven by said main change-speed gearing and extending from said main gearing and connected to drive said auxiliary gearing power input member, a transfer gear train arranged intermediate said main gearing and said auxiliary gearing, a first gear forming part of said transfer gear train, said first gear defining a coaxial bore, a power transmission member coaxially aligned with said main gearing power output shaft and with said auxiliary gearing power input member, said power transmission member connected to be driven by said main gearing power output shaft, said power transmission member extending coaxially through said coaxial bore, a power output member connected to be driven by said auxiliary gearing and connected to drive said first gear, a further gear driven by said first gear and forming part of said transfer gear train, the axis of said further gear being parallely spaced from said main gearing power output shaft, two oppositely-extending drive shafts coaxial with said further gear, and means connecting said further gear to drive said two drive shafts, a friction engaging means movable between two positions, said friction engaging means when in one of said positions arranged to select said planetary ratio, said friction engaging means when in the other of said positions arranged to select the said unit ratio, a mechanism for actuating said friction engaging means, said actuating mechanism operable to move the friction engaging means between the said two positions, and said actuating mechanism arranged on the side of the auxiliary epicyclic gearing remote from the transfer gear train.

11. The method of attaching a two-speed auxiliary gearing to a motor vehicle power transmission system of the kind which includes a main change-speed gearing, a transfer gear train arranged adjacent said main gearing, a first gear forming part of said transfer gearing, a power output shaft connected to be driven by said main change-speed gearing and extending from said main gearing for driving said first gear, a drive transmission means operatively interconnecting said main gearing power output shaft and said first gear of the transfer gear train, a further gear driven by said first gear and forming part of said transfer gear train, the axis of said further gear being parallely spaced from said main gearing power output shaft, two oppositely-extending drive shafts coaxial with said further gear, means connecting said further gear to drive said two drive shafts, a casing supporting the transfer gear train, said casing defining an opening coaxial with said main gearing power output shaft, power take-off means drivingly connected to said main gearing power output shaft, and said opening in the transfer gear casing providing access to said power take-off means, said method including removing said power take-off means from said main gearing power output shaft, disconnecting said drive transmission means, removing said first gear from said main gearing power output shaft, inserting the power input member and the power output gear of the auxiliary gearing through said opening in the transfer gear casing, connecting said power input member of the auxiliary gearing to the power output shaft of the main gearing, arranging the power output gear of the auxiliary gearing in the position that the power input gear to the transfer gearing originally occupied to mesh with the transfer gearing, and connecting the auxiliary gearing to the transfer gear casing.

12. A power unit, for a motor road vehicle, including an internal combustion engine, a crankshaft for transmitting power from said internal combustion engine, bearing means supporting said crankshaft for rotation about an axis transverse to the longitudinal centre line of said motor road vehicle, a main change-speed gearing connected to be driven by said crankshaft, a two-speed auxiliary gearing, a power input member connected to drive said auxiliary gearing, a power output shaft connected to be driven by said main change-speed gearing and extending from said main gearing and connected to drive said auxiliary gearing power input member, a transfer gear train arranged intermediate said main gearing and said auxiliary gearing, a first gear forming part of said transfer gear train, said first gear defining a coaxial bore, said main gearing power output shaft extending coaxially through said coaxial bore parallel to said crankshaft axis, a power output member connected to be driven by said auxiliary gearing and connected to drive said first gear, a further gear driven by said first gear and forming part of said transfer gear train, the axis of said further gear being parallely spaced from said main gearing power output shaft, two oppositely-extending drive shafts coaxial with said further gear and extending transversely of the motor road vehicle, and means connecting said further gear to drive said two drive shafts.

References Cited

UNITED STATES PATENTS

| | | | |
|---|---|---|---|
| 2,913,927 | 11/1959 | Issigonis | 74—701 |
| 2,971,395 | 2/1961 | Orr | 74—781 X |
| 3,182,528 | 5/1965 | Lamburn | 74—781 |

FRED C. MATTERN, JR., *Primary Examiner.*

DAVID J. WILLIAMOWSKY, *Examiner.*

C. J. HUSAR, *Assistant Examiner.*